United States Patent [19]

Hamilton

[11] 4,222,444
[45] Sep. 16, 1980

[54] METHOD OF WELL FLUID LEAK PREVENTION

[76] Inventor: Harold L. Hamilton, 1215 Loving Rd., Graham, Tex. 76046

[21] Appl. No.: 967,704

[22] Filed: Dec. 6, 1978

[51] Int. Cl.$^2$ .................... E21B 33/138; E21B 47/10
[52] U.S. Cl. .................................. 175/72; 166/253; 166/292; 166/65 M; 252/8.5 LC
[58] Field of Search .............. 175/72; 166/254, 65 M, 166/250, 253; 252/8.5 LC

[56]  References Cited
U.S. PATENT DOCUMENTS

| 2,401,280 | 5/1946 | Walstrom | 166/254 UX |
| 3,254,064 | 5/1966 | Nevins | 175/2 X |
| 3,362,476 | 1/1968 | Van Poollen | 175/72 X |
| 3,503,447 | 3/1970 | Hamby, Jr. | 166/254 |
| 3,993,146 | 11/1976 | Poundstone et al. | 175/206 |

FOREIGN PATENT DOCUMENTS 935377 10/1973 Canada .................................. 175/72

336410 4/1972 U.S.S.R. .................................. 175/72

Primary Examiner—Stephen J. Novosad
Attorney, Agent, or Firm—Clarence A. O'Brien; Harvey B. Jacobson

[57]  ABSTRACT

Magnetic material, such as discarded magnetic tape, is ground into small pieces and mixed with well drilling fluids. When the drilling fluids are lost in porous ground, cracks or fissures in the walls of the well, the magnetic tape will accumulate and serve to block the unwanted loss of the fluid. In the event that the fissures are of a size such that the tape will not block the flow, the magnetic properties of the tape may be utilized in combination with a standard well logging instrument to provide an indication of the exact location of the area of fluid loss. At that time, further remedial measures may be taken to block the undesired flow of fluid. For example, a cement slurry may be pumped into the well in the location of the crevices and thus form a permanent seal against loss of fluid.

5 Claims, 4 Drawing Figures

U.S. Patent   Sep. 16, 1980   Sheet 1 of 2   4,222,444
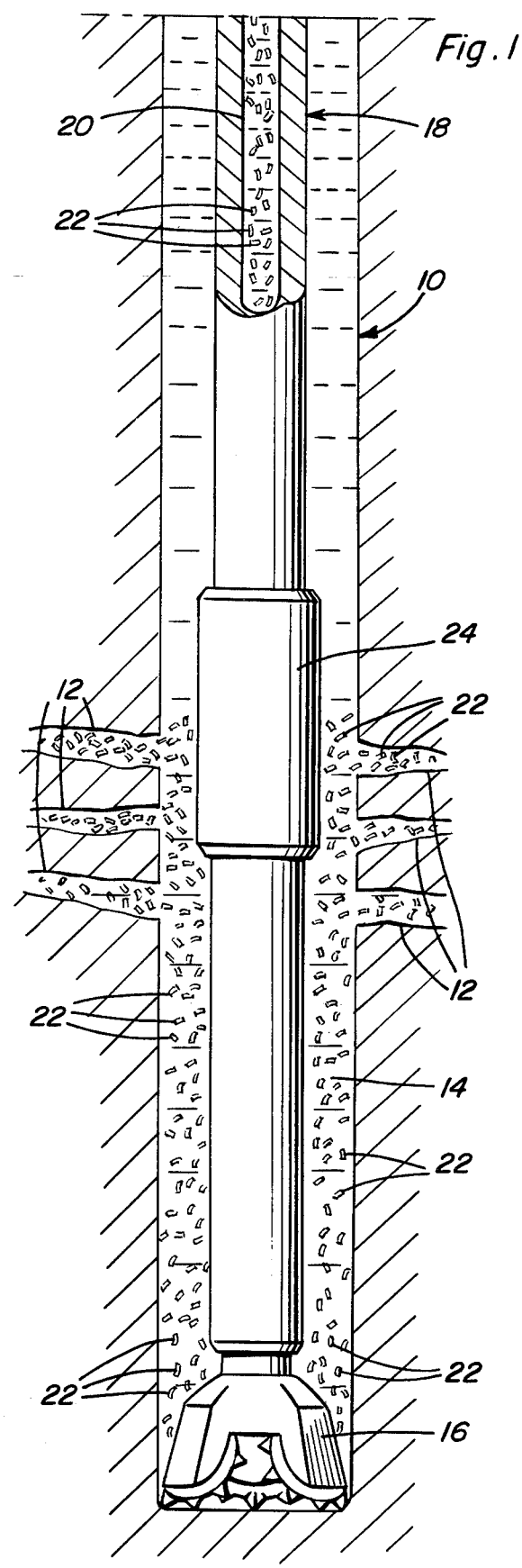
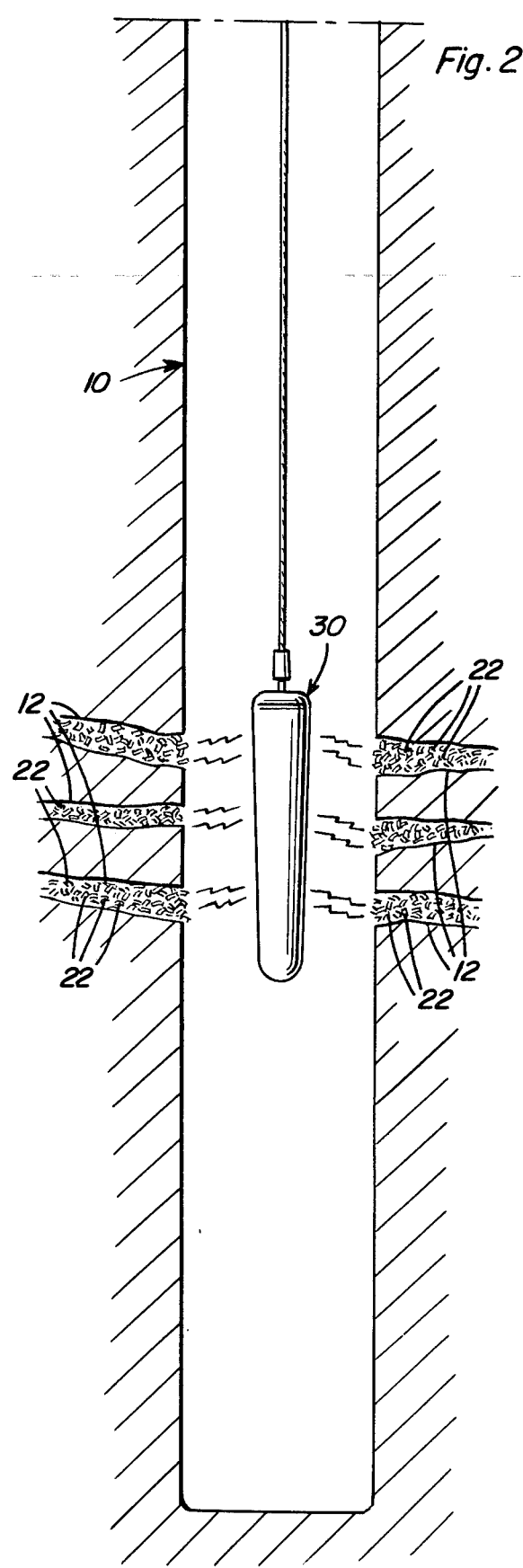

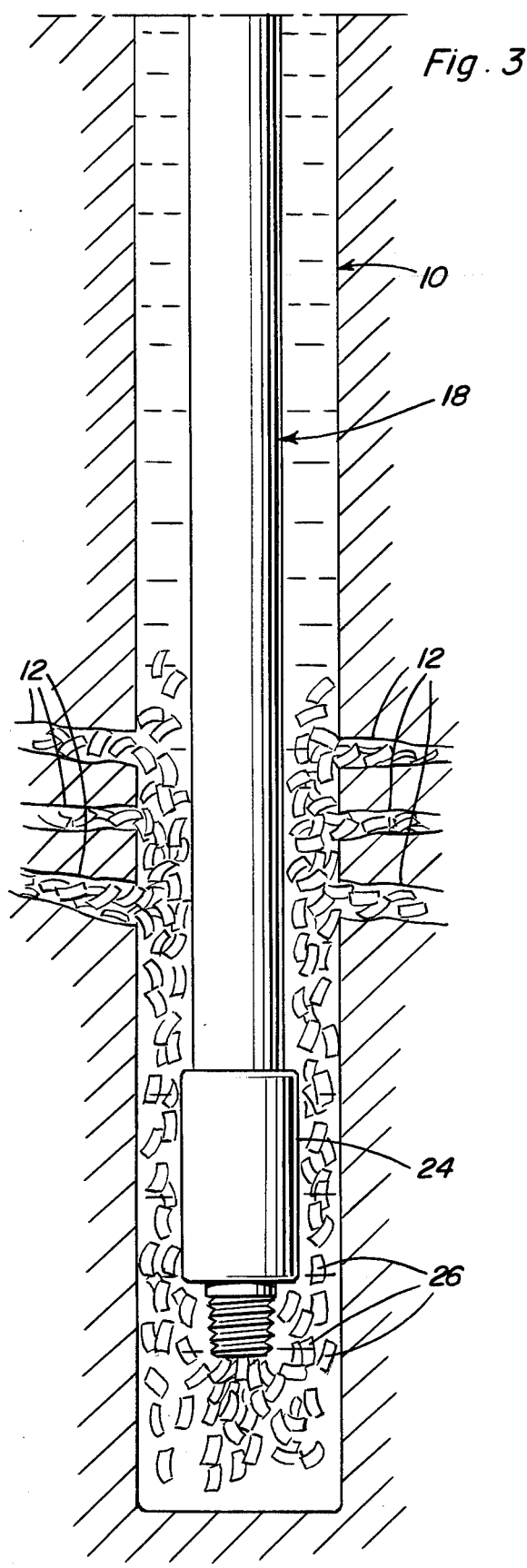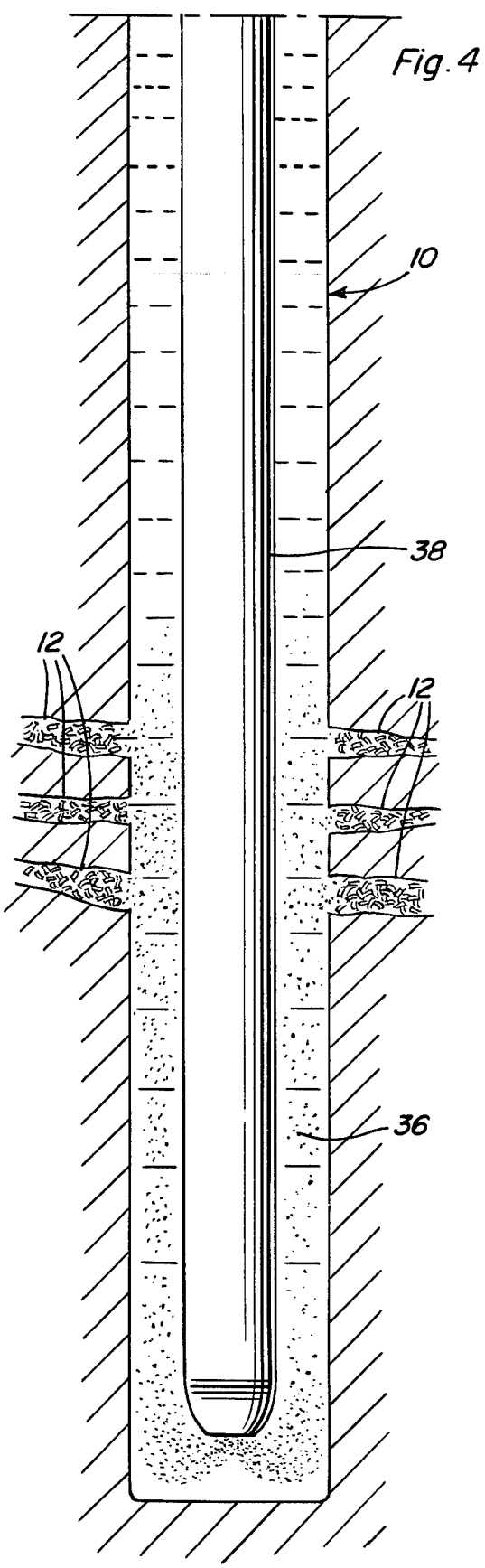

METHOD OF WELL FLUID LEAK PREVENTION

BACKGROUND OF THE INVENTION

1. Field of the Invention

This invention relates to a method of limiting and localizing the penetration of drilling fluid into porous underground strata, crevices and fissures during the drilling of wells.

2. Description of the Prior Art

In the well drilling industry, it is desirable and often necessary to insure that the walls of the bore hole are impermeable. This necessity arises since it is customary to provide a well drilling fluid which is passed downward through the drill string and upward externally of the drill string in order to cool, lubricate and carry away the cuttings produced by the drill bit. This drilling fluid has desirable properties which are interfered with by the loss of a liquid portion of the fluid through openings in the well wall.

Various methods for depositing material in openings in the bore hole wall to reduce or prevent lost circulation have been invented. U.S. Pat. No. 1,807,082 issued May 26, 1931 to Boynton discusses the introduction of mica flakes into the well fluid circulation for coating the wall of the well hole. U.S. Pat. No. 2,342,588 issued Feb. 22, 1944 to Larkin discloses the method of mixing a quantity of small pieces of sponge rubber with the well drilling fluid. The sponge rubber particles are deposited in the cracks and fissures and thereafter expand to fill them. U.S. Pat. No. 2,353,372 issued July 11, 1944 to Stone discloses the mixing of fragmented organic grainless foil with the well drilling fluid for circulation therewith and disposition within the cracks and fissures of the bore hole walls for reducing the lost circulation of the well drilling fluid. U.S. Pat. No. 2,634,236 discloses the admixing of fiberized leather with the drilling fluid. U.S. Pat. No. 3,221,825 issued Dec. 7, 1965 to Henderson discloses the mixing of cork particles with the well drilling fluid for sealing off the cracks and fissures of the well hole walls. U.S. Pat. No. 3,254,064 issued May 31, 1966 to Nevins discloses the use of solid, stretchable, deformable organic polymers in the well drilling fluid for blocking off leaks in the well hole walls. U.S. Pat. No. 3,568,782 issued Mar. 9, 1971 to Cox discloses the use of popcorn in the well drilling fluid. U.S. Pat. No. 3,788,405 issued Jan. 29, 1974 to Taylor discloses the use of a mixture of straw and chemical wood pulp fibers for blocking off the lost circulation in the well bore.

SUMMARY OF THE INVENTION

An object of the present invention is to provide a method for sealing off well bore holes to reduce lost circulation of well drilling fluids.

A further object of the present invention is to provide a method for reducing lost circulation which at the same time allows for safe, economical disposal of discarded magnetic tape.

Yet a further object of the present invention is to provide a method for preventing well fluid leaks whereby the location of the fluid leaks may be accurately logged by the use of a standard electric well logging instrument which will respond to the magnetic tape lodged in the low density areas of the well bore wall.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of a bore hole depicting the lost circulation to be prevented by the present invention.

FIG. 2 is an elevational view of a bore hole showing an electric well logging device disposed therein.

FIG. 3 is an elevational view of a bore hole showing large pieces of magnetic tape being lodged in the wall openings.

FIG. 4 is an elevational view of a bore hole showing a cement slurry being disposed within wall openings.

DESCRIPTION OF THE PREFERRED EMBODIMENT

Now with reference to the drawings, the method of the present invention will be specifically set forth. In the drawings, a well bore 10 is seen to include a plurality of cracks or fissures 12 through which the well drilling fluid 14 is allowed to escape as shown in FIG. 1.

The well drilling fluid 14 may comprise any standard known mud used for cooling, lubricating and removing chips cut by the drill bit 16. For example, fluid 14 may comprise a suspension of gel forming materials including clay or clay-like material, bentonite, etc. in water. The fluid 14 is introduced in a known fashion into the top of drill string 18 and is passed under pressure through the central passage 20 of that drill string. The fluid 14 then is forced out bit 16 and upwardly through well bore 10 between the outside of string 18 and the inside of the well bore.

In order to inhibit fluid loss through porous areas, or cracks and fissures 12, discarded magnetic computer tape such as made from polyester may be ground into a fine mass and admixed with the fluid 14. This magnetically coated polyester film may be cut into any desired size for controlling fluid loss in accordance with the dimensions of the cracks or fissures to be filled. For example, for controlling fluid loss in porous walls the film may be ground finely while chunks of film approximately $\frac{1}{8}$ inch by $\frac{1}{4}$ inch in size may be used for filling small cracks. Larger chunks approximately $\frac{1}{2}$ inch $\times$ 1 inch in size or 1 inch square may be used for controlling fluid loss in larger cracks and crevices. As shown in FIG. 1, the ground polyester film is shown schematically admixed with the fluid 14 at 22.

If necessary, bit 16 may be removed at coupling 24, as shown in FIG. 3, in order to allow the larger pieces of polyester tape shown at 26 to flow freely through the drill string and the well bore and become lodged in cracks or fissures 12. In this manner, a larger opening is provided for the polyester pieces thus allowing these pieces 26 to freely flow through the drill string and finally lodge in the fissures.

In any event, as seen in FIG. 2, a standard electrical well logging device 30 may be lowered into the well bore 10 whereby the magnetically coated polyester material 22 which has lodged in the cracks or fissures 12, will excite the well logging device and thereby make the presence of the cracks 12 readily apparent upon the well log produced by the device 30. Once the exact location of the cracks 12 are known, it is relatively easy to provide cement slurry as shown in FIG. 4 at 36 to the vicinity of the cracks thereby completely closing off these cracks or fissures. It will be noted that the slurry may be applied to the cracks or fissures in any known manner, the drawings showing a special nozzle 38 being provided for this purpose.

The method of the present invention allows for an attempt to close off areas of porosity in the well bore wall while the drilling operation continues by the addition of finely ground polyester tape to the well drilling fluid. If this procedure proves to be futile, larger polyester particles may be introduced into the well bore in a further attempt to close off the cracks or fissures, or the fissures may be located by the use of an electric well logging instrument which will positively locate the fissures through the aid of the magnetic properties of the tape lodged therein. At this time, cement slurry may be introduced in the vicinity of the cracks or fissures for positively sealing them off. Thus, the method of the present invention provides a means for not only preventing against well fluid leak but also provides a means of disposing of discarded computer tape in an economical manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of well fluid leak prevention comprising the steps of
   (1) admixing with a well drilling fluid, a substantial quantity of insoluble polyester film having a magnetic coating sensible by a well logging device, and
   (2) circulating the mixture through a well bore thereby allowing the particles to accumulate in the porous openings of the bore hole wall.

2. The method of claim 1 including the preliminary step of producing the particles from discarded magnetic computer tape.

3. The method of claim 1 including the step of locating the porous opening in the bore hole by use of an electronic well logging device after the particles have been trapped therein.

4. The method of claim 3 including the step of providing a cement slurry to the area localized by the use of the well logging device.

5. The method of claim 1 further including the preliminary step of removing the drill bit from the drill string for allowing large particles of material to pass therethrough for filling cavernous openings in the bore wall.

* * * * *